May 8, 1934.　　　E. A. ROCKWELL　　　1,958,205
LIQUID LEVEL INDICATOR
Original Filed Jan. 11, 1923　　3 Sheets—Sheet 1
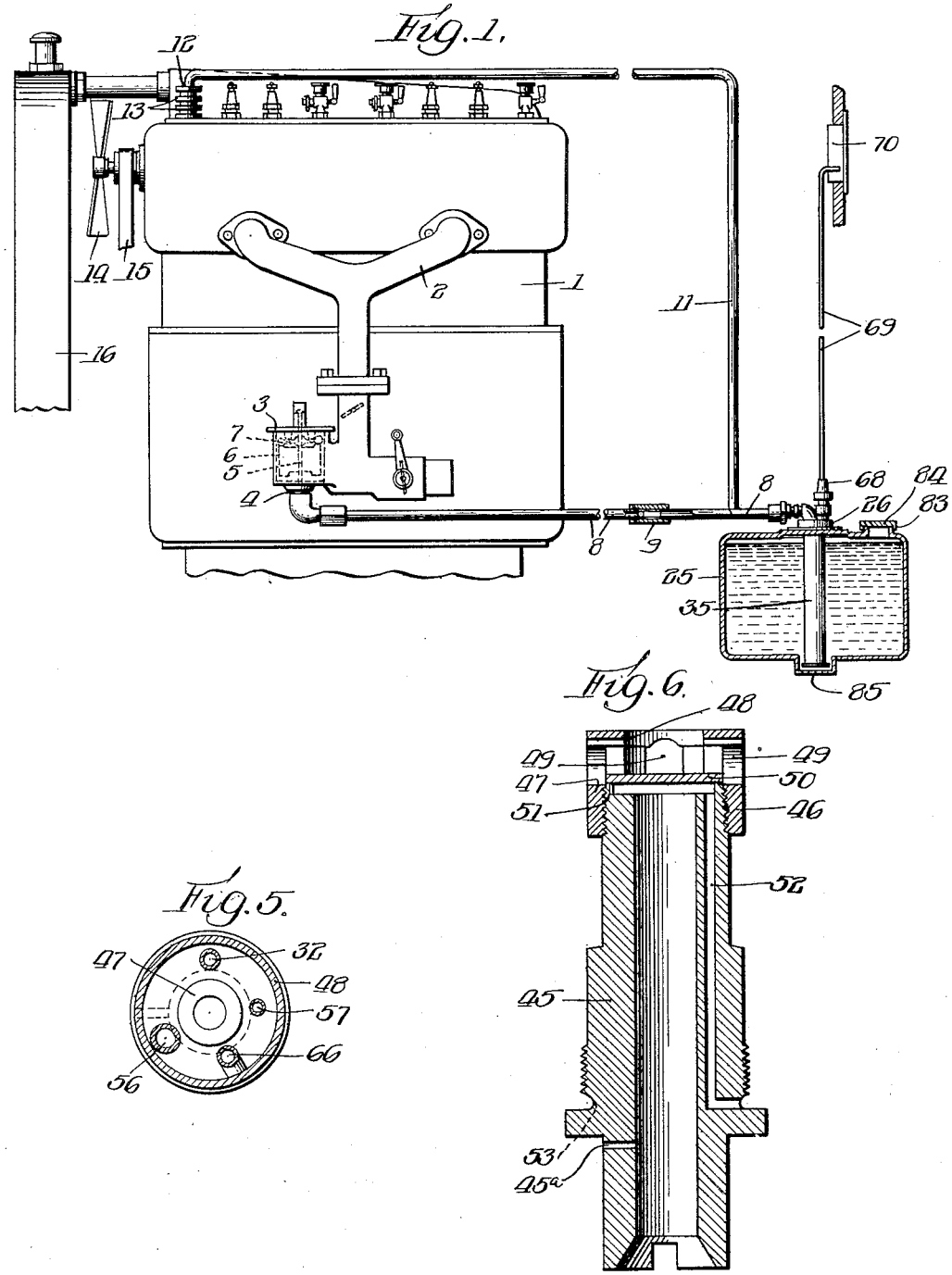
Inventor:-
Edward A. Rockwell, May 8, 1934.　　　　E. A. ROCKWELL　　　　1,958,205
LIQUID LEVEL INDICATOR
Original Filed Jan. 11, 1923　　3 Sheets-Sheet 2
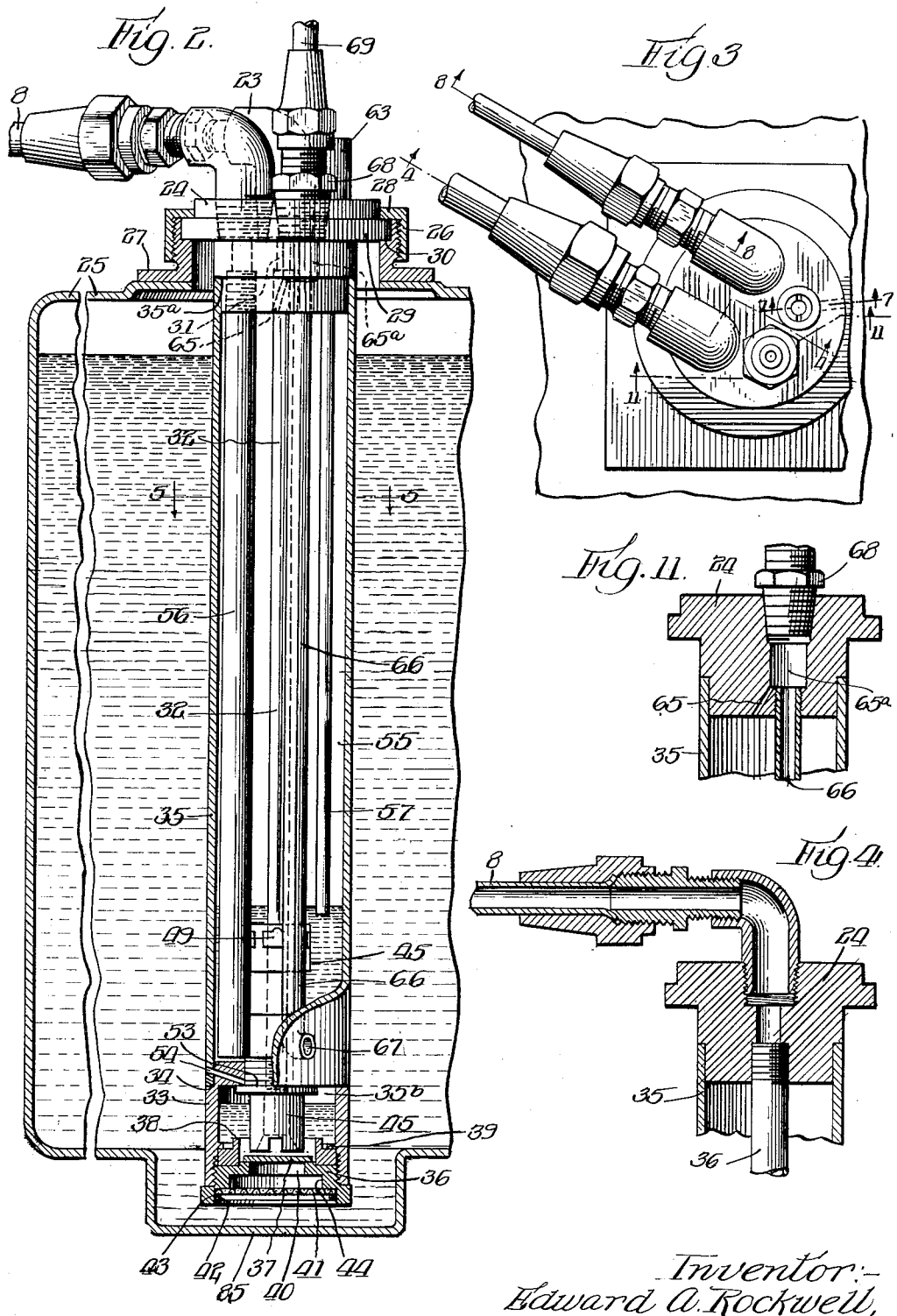
Inventor:-
Edward A. Rockwell, May 8, 1934.  E. A. ROCKWELL  1,958,205
LIQUID LEVEL INDICATOR
Original Filed Jan. 11, 1923   3 Sheets-Sheet 3
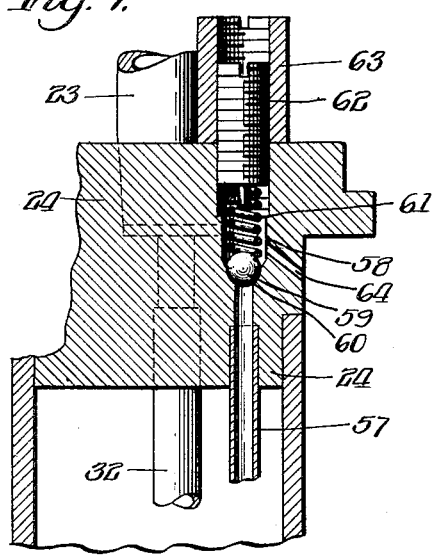
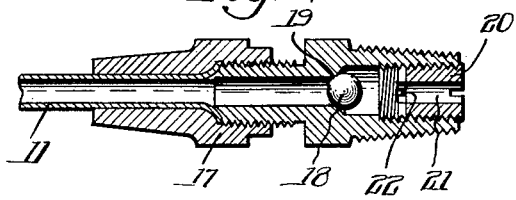
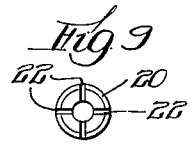
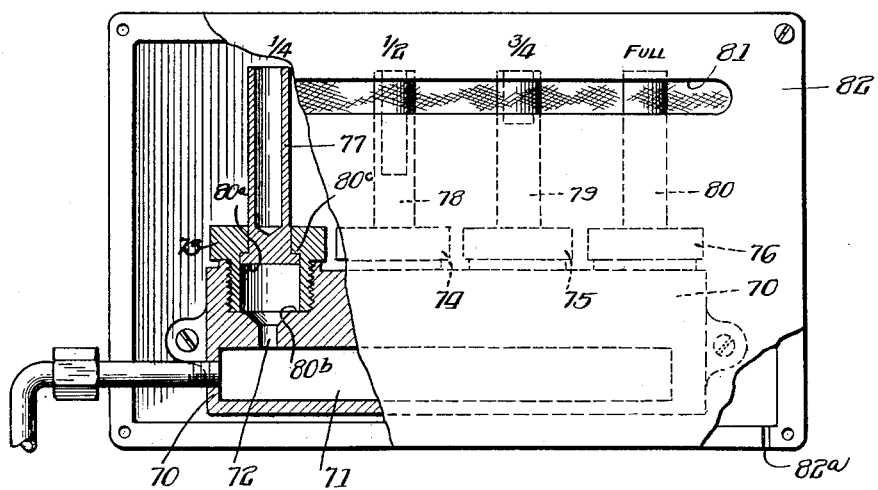
Inventor:—
Edward A. Rockwell, Patented May 8, 1934

1,958,205

UNITED STATES PATENT OFFICE 1,958,205

LIQUID LEVEL INDICATOR

Edward A. Rockwell, Chicago, Ill., assignor to Stewart-Warner Corporation, Chicago, Ill., a corporation of Virginia Continuation of abandoned application Serial No. 631,791, April 13, 1923, which in turn is a division of application, Serial No. 611,948, January 11, 1923, now Patent No. 1,470,484, dated October 9, 1923. This application September 30, 1929, Serial No. 396,287

11 Claims. (Cl. 73—54)

This application is a continuation of my hitherto pending application Serial No. 631,791, filed April 13, 1923 as a division of a parent application Serial No. 611,948, filed January 11, 1923, issued as Patent No. 1,470,484, dated October 9, 1923.

My invention relates particularly to an apparatus designed to indicate the level of a liquid in a container or reservoir, but it has reference more particularly also to the indication of the liquid level in a fuel reservoir such, for example, as used with automobile engines.

The object of my invention is to provide an indicator from which the liquid level in a container or reservoir may be readily seen, but it has reference especially also to the indication of the level of the liquid in fuel reservoirs, such, for example, as are used in connection with automobile engines. A further object is to provide an indicating device of the above character in which there are no moving plates between the liquid level and the indicator, thus obviating any likelihood of the apparatus becoming ineffective in operation and obviating the necessity of making any repairs in the connections between the reservoir and the indicator in inaccessible parts of the automobile. A further object is to provide a device of this character in which the indicator may be located in any desired place, but it may be conventionally located upon the instrument board of the automobile where it may be readily seen by the driver.

Wherever it is desirable to indicate the fuel level in a reservoir it is customary to employ an indicating device separate from the reservoir and adapted to be placed in communication with the reservoir by a pressure-transmitting duct which opens within the tank at a level above which the fuel level is to be measured and indicated. Gas pressure must be supplied to this duct to scavenge the duct of fuel and continuously deliver through the lower end of the duct within the tank a small amount of gas in order that the indicating device will accurately register a level commensurate with the level of fuel in the reservoir above the lower end of the pressure-communicating duct. If the level of the fuel in the reservoir is subjected to atmospheric pressure, only one duct in communication with the indicator is necessary but if the liquid level is maintained under super-atmospheric pressure, a second duct communicates between the upper portion of the reservoir and the indicating device in order that the indicating device will register the difference between the pressures transmitted to the fuel through the ducts and correctly register the level in the reservoir. If the liquid is fed from the reservoir to a higher level under pressure, the pressure required is much greater than the pressure necessary to scavenge the indicating duct and it is therefore wasteful to transmit the same amount of pressure which is utilized for feeding the liquid from the reservoir to scavenge the indicating line of liquid. It is further desirable that the indicating device correctly register the level continuously during the feeding of the liquid from the reservoir instead of only momentarily, as determined by the operator. According to the present invention the entire pressure developed for feeding the fuel from the reservoir to a higher level is not used to clear the indicating line of fuel, but, instead only a portion of this pressure is used. Therefore, if the present system is employed for feeding fuel from an atmospheric supply tank, the maximum pressure upon the fuel being fed may be much greater than the pressure in the indicating line. The improved result is obtained according to the described embodiment by maintaining a body of trapped gas over the fuel being fed under a pressure sufficient to deliver the fuel to the highest level and a restricted communication is provided between this body of trapped gas and the indicating line whereby the small amount of gas delivered to the indicating line is sufficient to continuously scavenge the indicating line of fuel during feeding of fuel from the tank and the indicating device will correctly register the level of fuel within the tank.

Further objects of my invention will appear in the detailed description contained hereinafter.

While my invention is capable of being carried out in many different ways, for the purpose of illustration I have shown only certain ways of carrying out the same in the accompanying drawings, in which Figure 1 is a diagrammatic side elevation of a pressure feed system made in accordance with my invention.

Figure 2 is a vertical section, enlarged, of a portion of the apparatus which is associated with the main supply tank.

Figure 3 is a top view of the apparatus.

Figure 4 is a section thereof taken on the line 4—4 of Figure 3.

Figure 5 is a horizontal section of the apparatus taken on the line 5—5 of Figure 2.

Figure 6 is a vertical section of a portion of the same showing one of the valves.

Figure 7 is a large vertical section of the upper portion of the apparatus taken on the line 7—7 of Figure 3 and showing the pressure regulating means.

Figure 8 is a longitudinal section of a check valve.

Figure 9 is an elevation of a screw plug therein for limiting the amount of pressure delivered to the apparatus.

Figure 10 is a front elevation partly in section of the indicator, and

Figure 11 is a detail vertical section on reference line 11—11 of Figure 3.

In the drawings I have shown an internal combustion engine, 1, which may, for example, be an engine such as is used on automobiles having a manifold, 2, supplied with fuel from a carbureter, 3. The carbureter, 3, may be of any desired type, but may, for example, comprise a carbureter having a fuel feed opening, 4, the flow of fuel to which is regulated or controlled by a pin-valve, 5, operated by means of a float, 6, connected to the valve, 5, by means of a lever, 7. The supply of fuel to the carbureter through the feed opening, 4 is obtained from a conduit, 8, having a check valve, 9, leading to the rear of an automobile. A second conduit, 11, is connected to the interior of one of the cylinders of the engine, as, for example, by introducing the same into a petcock opening at the upper portion thereof. Preferably the conduit, 11, is connected to the cylinder of the engine which is nearest to the front of the same by means of a cooling device, 12, having cooling flanges, 13, located in the rear of a fan, 14, driven by a belt, 15, in any suitable manner from the engine, the fan, 14, being the usual fan carried by an automobile engine in the rear of the radiator, 16, to assist in the cooling of the water passing through the radiator. In the conduit, 11, there is a check valve, 17, comprising a ball, 18, adapted to seat against a valve seat, 19, in the direction towards the engine and to contact with a screw plug, 20, in the other direction which is provided with a central passageway, 21, and small lateral notches or slits, 22, so as to permit only a limited amount of gas under pressure to pass through the same to the feeding apparatus.

The check valve, 17, is screw-threaded into an elbow fitting, 23, which in turn is screw-threaded into a die-casting, 24. The die-casting, 24, is fastened in the top of a supply reservoir, 25, for gasolene by means of an annular cover, 26, screw-threaded to an annular fitting, 27, brazed or soldered to the top of the tank, 25. For this purpose the annular cover, 26, is provided with an inwardly directing flange, 28, which fits over an annular projection, 29, on the die-casting, 24, and which is seated against a shoulder, 30, on the annular fitting, 27. The interior of the fitting, 23, communicates with a passageway, 31, in the die-casting, 24, and through the passageway, 31, with a tube, 32, the lower end of which passes through and is fastened into a housing, 33, provided with a shoulder, 34, for receiving the lower end of a main housing, 35, fastened at its upper end to the die-casting, 24, where it is seated against a shoulder thereon, 35$^a$. The housing, 33, forms a primary chamber, 35$^b$, the lower end of which is provided with a screw-threaded retainer, 36, to hold in place a circular flat valve, 37, carried within a retaining member, 38, which is seated against a shoulder, 39, in the housing, 33. The retainer, 36, has an inlet opening, 40, to permit the access of the liquid to the valve, 37, and said opening, 40, is closed with a screen, 41, held in place by a split ring, 42, located in a groove, 43, located on the inside of the passageway, 40.

The movement of the valve, 37, in a lower direction is limited by an annular extension, 44, on the retainer, 36, and in an upward direction by contacting with the lower end of a tube, 45, which is screw threaded into the upper end of the housing, 33. The tube, 45, has a port, 45$^a$, in its lower portion venting into the chamber, 35$^b$, and at its upper end is provided with an upper valve retaining member, 47, having a central opening, 48, and a plurality of laterally directed openings, 49, to permit the passage of the liquid when a disk-shaped valve, 50, is not seated against its valve seat, 51, located at the upper end of the tube, 45. In order to relieve any excess pressure conveyed to the apparatus from the engine cylinder to the chamber, 35$^b$, and to permit the entry of the fuel past the valve, 37, into said chamber, 35$^b$, a passageway, 52, extends downwardly within the wall of the tube, 45, from the upper end, and thence outwardly to connect with an annular passageway, 53, located in the housing 33 which in turn leads to the outside of the feeding apparatus and into the interior of the reservoir, 25, through an opening, 54. The fuel which enters the chamber, 35$^b$, past the valve, 37, is forced through the tube, 45, past the valve, 50, into a secondary chamber, 55, formed by the main housing, 35. The liquid accumulates there at the bottom of the chamber and the gas which has entered the chamber accumulates above the level thereof in such a manner as to continually force the liquid out of the chamber, 55, through a pipe, 56, to the pipe, 8, and thence to the carbureter connected to the engine.

In order to regulate or control the feed of fuel and also to prevent the accumulation of excess pressure in the secondary chamber, 55, and to control the level of the liquid therein (although if desired this feature may be omitted) I have provided a pipe, 57, which extends upwardly in the chamber, 55, above the level of the liquid therein, and is secured in the die casting, 24, where it communicates with a valved chamber, 58, having a ball valve, 59, which is pressed against its seat, 60, by means of a spring, 61, the pressure of which may be regulated by a screw plug, 62, screw-threaded in the die casting, 24, and having a lock nut, 63, screw-threaded to the upper end of the plug, 62. Communicating with the valve chamber, 58, there is a laterally directed pasageway, 64, which passes out of the die casting and communicates with the interior of the reservoir, 25. Leading from the interior of the chamber, 55, there is a slender, and thereby restricted, vertical passageway, 65, located in the die casting communicating with a chamber, 65$^a$, therein connecting with a tube, 66, which passes downwardly from the passageway, 65, to a port, 67, located in the side of the housing, 35, near the lower end of the same.

It will be understood that the trapped gas in chamber 55 is maintained under sufficient pressure to insure the delivery of the fuel to the float chamber of the carbureter at a constant pressure independent of the level of the fuel in the supply tank and that the restricted passage 65 transmits to the pressure-transmitting indicating duct 66 only a small portion of the gas trapped in chamber 55 during the feeding of the fuel. Therefore the pressure in chamber 55 may be much greater than the pressure transmitted to the duct 66. The gas bled through the restricted passage 65 however is sufficient to continuously scavenge the indicating line 66 of fuel in order that the indicating device will correctly register the level of fuel in the tank.

And so much of the pressure as may be thus vented constitutes a deduction from the amount which would otherwise be vented into the chamber, 25, past the spring-seated valve, 59, through the port, 64. Accordingly, in the upper end of the chamber, 65ª, there is screw-threaded a fitting, 68, which is connected by a tube, 69, to a gasolene level indicator, 70, located at any suitable point, but preferably on the dash of the automobile. The indicator, 70, comprises a casting, 70ª, having a horizontal passageway, 71, which communicates with four or more upwardly directed passageways, 72, leading to four cylinders, 73, 74, 75 and 76, carrying plungers, 77, 78, 79 and 80, which are of the same size but have progressive differences in weights due to the coring out of the same as shown in dotted lines, indicating respectively the one-fourth, one-half, three quarters and full positions of the gasolene level in the fuel supply reservoir, 25. Each of the plungers has a piston, 80ª, located thereon, the movement of which is limited in a downward direction by a shoulder, 80ᵇ, in the casting, 70ª, and the upper movement of which is controlled by an annular projection, 80ᶜ, at the upper end of the cylinder. The shoulder, 80ᵇ, and annular projection, 80ᶜ, operate as valve seats also to prevent the escape of the gas under pressure in the indicator.

The upper ends of the plungers, 77, 78, 79 and 80 preferably project above a glass covered slot, 81, in dust-proof housing, 82, having a small vent, 82ª mounted on the dash so that by observing the positions of the respective plungers the level of the gasolene in the main supply tank will always be known to the driver of the car. The gasolene reservoir, 25, is provided with the usual cap, 83, having a vent opening, 84, and preferably at the bottom of the tank there is a depression, 85, for receiving the lower end of the feeding apparatus.

In the operation of my invention, immediately that the engine, 1, is turned over for the purpose of starting the same, the compression produced in the cylinder to which the conduit, 11, is connected, will be conveyed to the conduit, 11, and when the engine cylinder is firing the explosion gases will be conveyed in this way to the conduit, 11, after having been cooled by the cooling device, 12. The gases in the conduit, 11, will continue past the ball valve, 18, and through the notches, 22, on the plug, 20, to the pipe, 32, and thence into the primary chamber, 35ᵇ, which has been previously supplied by gravity with gasolene, from the reservoir, 25, through the opening, 40, owing to the venting of said chamber through the passageways, 52, 53 and 54, leading to the interior of the reservoir, 25. The gases under pressure in the chamber, 35ᵇ, will force the gasolene therefrom through the tube, 45, and past the valve, 50, into the chamber, 55, a small portion of the gases and liquid which pass through the tube, 45, being forced outwardly through the passageways, 52, 53 and 54, to the gasolene reservoir, thus serving as a cushion against any excessive pressure conveyed to the chamber, 35ᵇ, from the engine.

The gases and liquid in the chamber, 55, separate to form a body of liquid at the bottom of said chamber and a body of gas at the upper portion thereof, and the level of the liquid in the chamber and the pressure of the gas therein are both regulated by the presence of the tube, 57, constituting a vent passage, leading from the point in the chamber, 55, at which the liquid level is to be maintained upwardly to the pressure regulating valve, 59, the pressure of which may be adjusted by adjusting the position of the screw plug, 62. It will thus be understood that by means of the tube, 57, which is connected in this way to the interior of the reservoir through the tube, 64, any excessive pressure of gas in the chamber, 55, is vented and conveyed away from the same as well as any quantity of the gasolene which may accumulate therein above the level of the lower end of the tube, 57. In this way, uniform conditions of pressure and quantity of liquid in the chamber, 55, are maintained so as to provide a gasolene feed through the tube, 56, to the carbureter of the engine which will be maintained uniform at all times. It will be understood that when the valve, 5, is seated by the float, 6, owing to the float chamber containing an adequate supply of gasolene, the gasolene will cease feeding through the tube, 56, and the resulting excess of gas and liquid which may reach the chamber, 55, will pass outwardly therefrom into the interior of the reservoir, 25, by way of the tube, 57, past the valve, 59, and through the duct, 64. Otherwise it would be conveyed past the valve, 5.

Consequently, there will be within the tube, 66, a pressure of gas which will be determined by the height of the gasolene level above the gas pressure outlet, 67, and this pressure within the tube, 66, acts upon the plungers, 77, 78, 79, and 80, so as to indicate the corresponding level of the gasolene in the reservoir, 25. In this way the disappearance of the plunger, 80, from view will indicate that the reservoir is only three-quarters full. When the plunger, 79, can no longer be seen, this will indicate a reservoir that is one-half full. The lowering of the plunger, 78, will show that the tank is only one-quarter full and the disappearance of the plunger, 77, will indicate that the reservoir is less than one-quarter full and should therefore be filled immediately.

I claim:

1. In a fuel supplying and indicating system, a fuel supply tank, a fuel delivery conduit leading therefrom, said conduit including an air and vapor trapping chamber in which a body of trapped gas is maintained under pressure over the fuel being fed, a fuel level indicating device actuated by pressure, a duct leading from said device into said tank and open at its lower end within said tank at a level above which the liquid level is to be indicated and there being a communication for restrictedly bleeding gas from said trapping chamber into said duct to scavenge said duct of fuel and correct the reading of the indicating device continuously during the feeding of fuel from said tank.

2. In combination, a liquid reservoir arranged to have a body of liquid therein at atmospheric pressure and means for feeding liquid therefrom, said means comprising a chamber connected for receiving at the lower part liquid from the reservoir, a liquid discharge connection from said chamber, means connected to said chamber from a source of super-atmospheric pressure for supplying and maintaining a body of trapped gas over the liquid in said chamber, a duct leading into said reservoir open at its lower end at a level in said reservoir above which the fuel level is to be indicated, a pressure-operated level indicator operatively connected with said duct and there being a restricted communication between said body of trapped gas and said duct to scavenge the liquid from said duct in order that the pressure in said duct will be commensurate with the actual head of liquid measured.

3. In combination, a liquid reservoir arranged to contain a body of liquid therein at atmospheric pressure and pressure means for feeding liquid therefrom, said means comprising a closed chamber having liquid inflow communication at its lower part with the liquid content of the reservoir, a liquid discharge connection from the lower part of said chamber, means connected to said chamber from a source of super-atmospheric gas pressure for supplying and maintaining a body of trapped gas over the liquid in said chamber, said gas pressure constituting the pressure for feeding the liquid from the reservoir, a duct leading into said reservoir open at its lower end at a level in said reservoir above which the fuel level is to be indicated, a pressure operated level indicator operatively connected with said duct and there being a restricted communication between said body of trapped gas and said duct to scavenge the liquid from said duct in order that the pressure in said duct will be commensurate with the actual head of liquid measured.

4. In combination, a liquid reservoir arranged to contain a body of liquid therein at atmospheric pressure and pressure means for feeding liquid therefrom, said means comprising a closed chamber in the reservoir having inflow communication at its lower part with the liquid content of the reservoir, a liquid discharge connection from the lower part of said chamber, means connected to said chamber from a source of gas pressure for supplying and maintaining a body of trapped gas over the liquid in said chamber, means for limiting the pressure of the trapped gas and predetermining the depression of the level of liquid in said closed chamber, said means consisting of a duct opening for intake in the chamber at a predetermined level extending upward for discharge exteriorly of the chamber, a normally seated valve controlling the discharge from said duct, a second duct leading into said reservoir open at its lower end at a level above which the fuel is to be indicated, a pressure operated level indicator operatively connected with said duct and there being a restricted communication between said body of trapped gas and said second duct to scavenge the liquid from said duct in order that the pressure in said duct will be commensurate with the actual head of liquid measured.

5. In combination, a liquid reservoir arranged to contain a body of liquid therein at atmospheric pressure and means for feeding liquid therefrom with the air of superatmospheric pressure, said means comprising a chamber having at its lower part communication with the liquid containing space of the reservoir, a valve controlling said communication opening for inflow from the reservoir to said chamber and seating against reverse flow, a liquid discharge connection from said chamber, means connected to said chamber from a source of super-atmospheric pressure for supplying and maintaining a body of trapped gas over the liquid in said chamber, a duct leading into said reservoir open at its lower end at a level in said reservoir above which the fuel level is to be indicated, a pressure operated level indicator operatively connected with said duct and there being a restricted communication between said body of trapped gas and said duct to scavenge the liquid from said duct in order that the pressure in said duct will be commensurate with the actual head of liquid measured.

6. In combination, a liquid reservoir arranged to contain a body of liquid under atmospheric pressure, means for feeding the liquid therefrom to a place of use, said means comprising a pressure chamber arranged to derive a liquid content from the reservoir, means for producing gas pressure in said chamber, said chamber being adapted to trap a body of gas under pressure above the level of liquid in said chamber for feeding the liquid from the reservoir to a place of use, a duct restrictedly communicating at its upper part with the body of trapped gas and open at its lower end within the reservoir at a level above which the level in the reservoir is to be indicated, a pressure operated liquid level indicator and a duct having pressure communication with said first-mentioned duct and leading thence to said indicator for operating the same to indicate the level in the reservoir.

7. In the construction defined in claim 6, a vent passage from said pressure chamber for preventing excessive pressure from said chamber, a yieldingly seated valve controlling said vent passage and adjustable means for holding the valve seated at a predetermined pressure against discharge from the vent passage.

8. In the construction defined in claim 6, means for limiting the pressure produced in said pressure chamber comprising a vent pipe extending into said chamber having its intake at a level predetermined by the limit of depression of the liquid level in the chamber and extending upwardly therefrom, a normally seated valve controlling the discharge from said vent pipe and adjustable means for holding the valve seated at a predetermined pressure against discharge from the vent pipe.

9. In the construction defined in claim 6, the first-mentioned duct comprising a pipe extending downward in the pressure chamber and connected fluid-tight at a lateral opening in the chamber wall for liquid communication with the reservoir.

10. In a liquid level indicating system a reservoir adapted to contain liquid the level of which is to be indicated, a pressure-operated level indicating device, a duct leading from said indicating device into said reservoir open at its lower end at a level in said reservoir above which the liquid level is to be indicated, a pressure chamber adapted to receive and maintain a body of trapped gas at super-atmospheric pressure above the liquid in said chamber, an inlet check valve at the bottom of said last-mentioned chamber adapted to be sealed by the liquid in said chamber and there being a communication for delivering gas from said body of trapped gas into said duct to scavenge said duct of liquid and correct the reading of said indicating device.

11. In combination with an internal combustion engine, a fuel supply tank and a pressure operated level indicator, a pressure transmitting duct leading from said indicator to said tank open at its lower end within said tank at a level above which the fuel level is to be indicated, a chamber in restricted communication with said duct from which gas is delivered under pressure to said duct for scavenging said duct of fuel to correct the reading of the indicator, a check valve-controlled inlet connection to said chamber, said inlet check valve being normally submerged in fuel for sealing the inlet connection and means operated from a source of fluctuating pressure derived from the engine for supplying gas to said chamber past said inlet check valve.

EDWARD A. ROCKWELL.